March 16, 1943.   M. M. TEAGUE   2,314,179
WOODWORKING MACHINE
Filed July 30, 1941   4 Sheets-Sheet 1

MONROE M. TEAGUE
Inventor

By Eaton & Brown
Attorneys

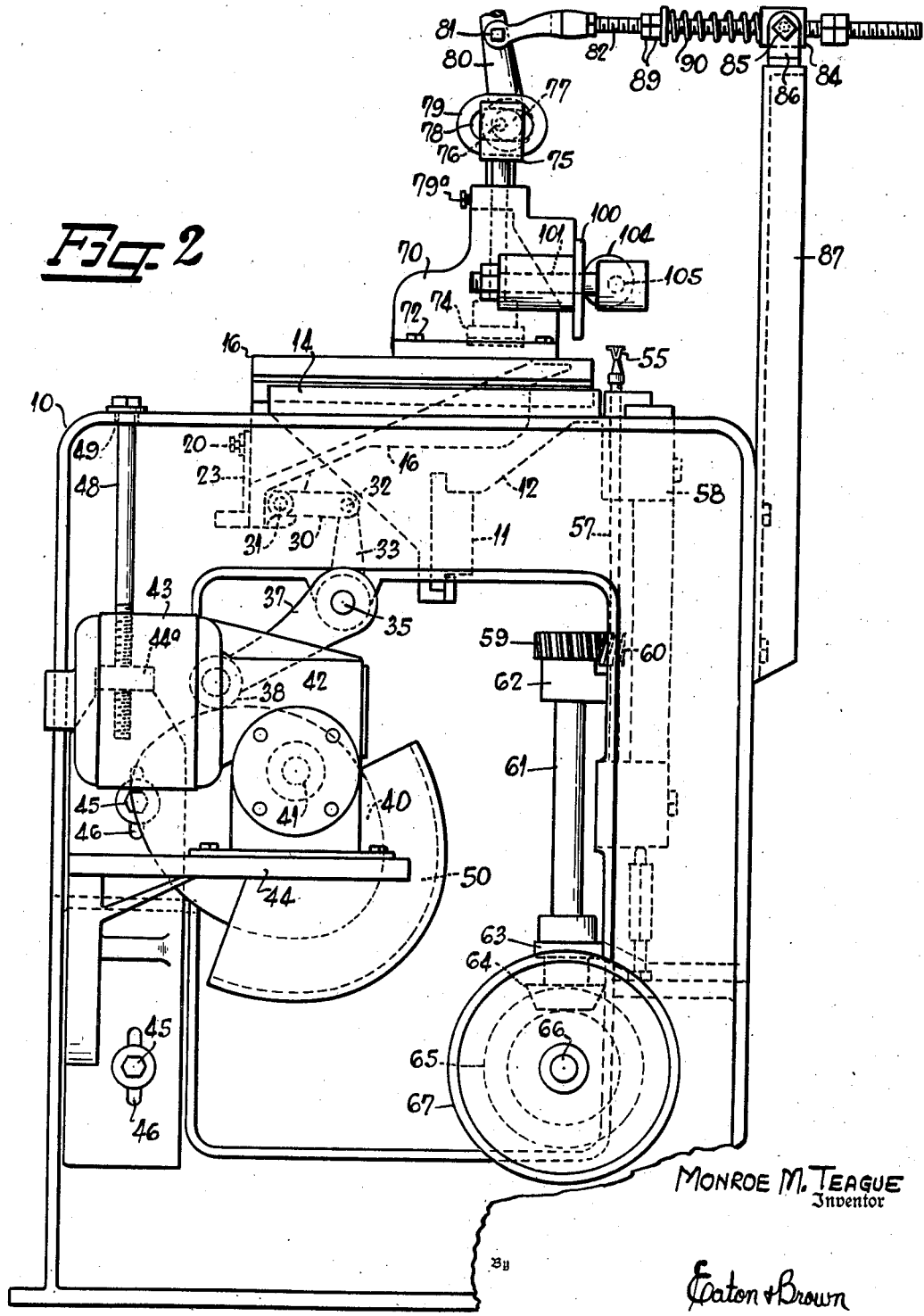

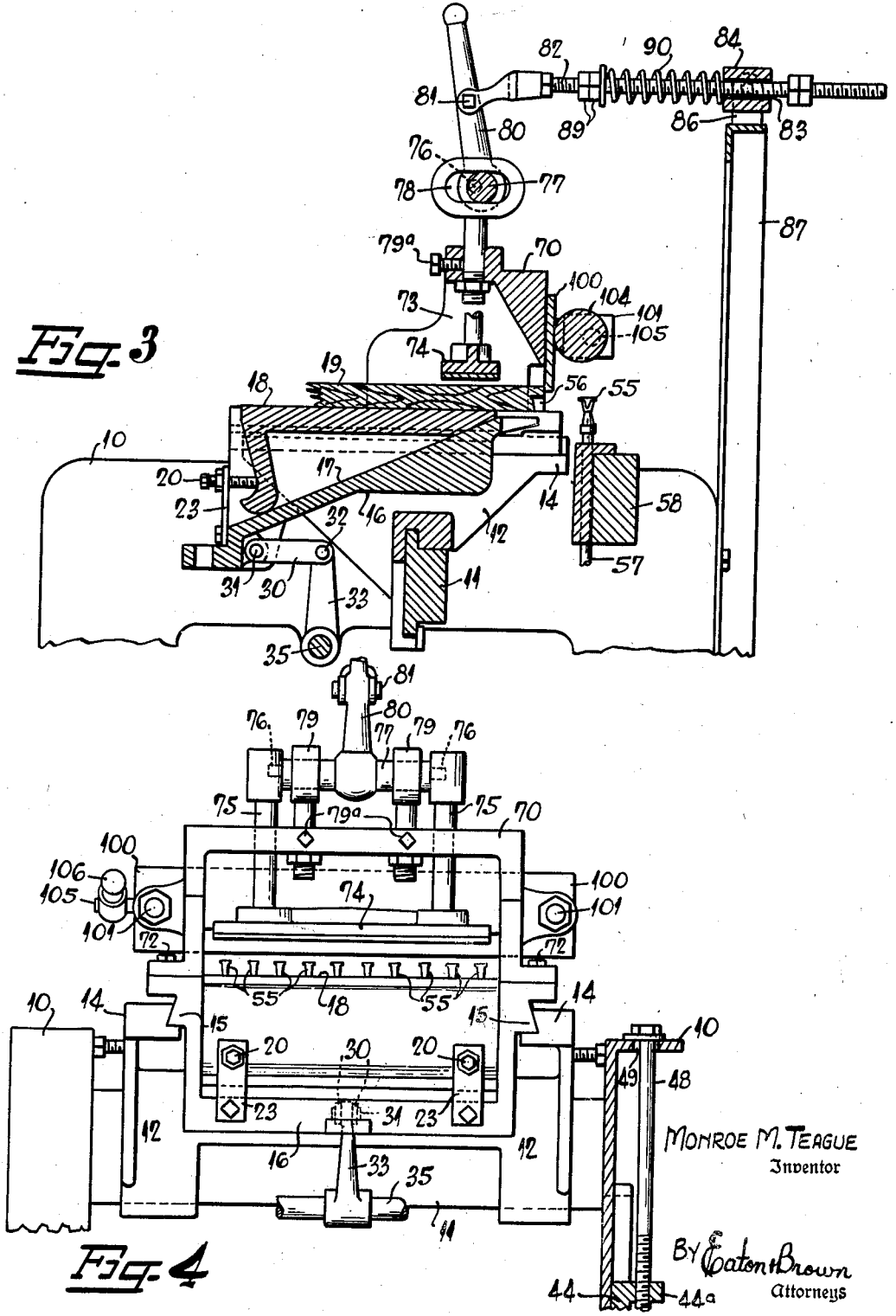

March 16, 1943.  M. M. TEAGUE  2,314,179
WOODWORKING MACHINE
Filed July 30, 1941  4 Sheets-Sheet 4
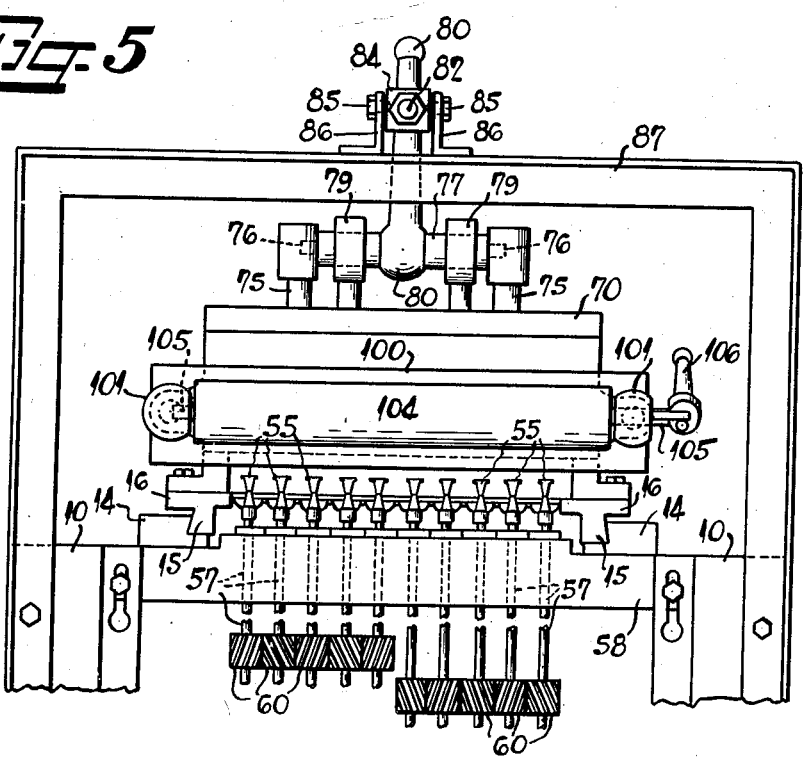
Fig. 5
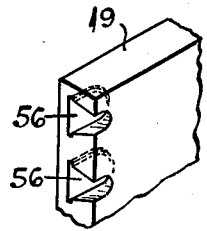
Fig. 6
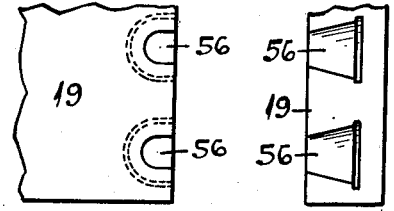
Fig. 7  Fig. 8
| Rotation of Shaft 35 | 0° | 90° | 135° | 180° | 245° 270° | 360° |
|---|---|---|---|---|---|---|
| Cam 40 & Roller 38 | 40, 38 | | | | | ,50 |
| Carriage Moving Forward | | | | | | |
| Carriage in Advanced Position | | | | | | |
| Carriage Returning | | | | | | |
| Mortises 56 Being Cut | | | | | | |
| Clamp 74 Moving To Gripping Position | | | | | | |
| Clamp 74 In Gripping Position | | | | | | |
| Clamp 74 Releasing Workpiece | | | | | | |
Fig. 9
Inventor:
MONROE M. TEAGUE
By
Eaton & Brown
Attorneys Patented Mar. 16, 1943

2,314,179

UNITED STATES PATENT OFFICE 2,314,179

WOODWORKING MACHINE

Monroe M. Teague, Lenoir, N. C.

Application July 30, 1941, Serial No. 404,709

3 Claims. (Cl. 144—278)

This invention relates to wood working machines and more especially to a machine having novel provisions for cutting mortises in the edges of boards. These mortises are adapted to receive tenons which are cut in another board to thereby form a dovetailed connection.

It is an object of this invention to provide a mortise cutting machine equipped with means for automatically clamping and moving a workpiece into engagement with cutting elements to cause the mortises to be cut, and then to automatically retract the workpiece from the cutting elements while unclamping the same.

It is another object of this invention to provide a mortise cutting machine having means for holding the workpiece for a predetermined time interval in its most advanced position relative to the cutting elements to thereby insure that each mortise will be cut and reamed to the same size and depth. This time interval is a rest period, during which the cutting elements are rotating in the deepest portions of the mortises. Where the workpiece is immediately retracted, after reaching its most advanced position, the depth of the mortises will vary according to the type of material used. For example, where hard material is used, the cutters often flex or bend slightly as the workpiece is advanced. If a hard workpiece is suddenly reversed after being advanced, the mortise will not be cut or reamed to the desired depth. On the other hand, if a soft material is used as a workpiece, this bending or flexing of the cutters will not occur; consequently the mortises will be cut the desired depth. However, by providing a rest period for the workpiece when advanced to extreme cutting position, the cutters will have time to cut the mortises in the hard material to the same depth as in soft material.

It is another object of this invention to provide a machine of the class described having an adjustment for regulating the depth of mortise cut, an adjustable timing means for controlling the automatic clamping and releasing mechanism, and also means for varying the amount of pressure exerted by the clamp upon the workpiece when in advanced position.

Some of the objects of the invention having been stated, other objects will appear as the description proceeds, when taken in connection with the accompanying drawings, in which—

Figure 2 is an elevation looking at the right hand side of Figure 1;

Figure 3 is a vertical sectional view taken through the upper portion of the dovetailing machine along the line 3—3 in Figure 1;

Figure 4 is a front elevation with certain portions thereof in section, and taken along the line 4—4 in Figure 1;

Figure 5 is a rear elevation looking along the line 5—5 in Figure 1;

Figure 6 is an isometric view showing a portion of a board in which mortises have been cut with the present mechanism;

Figure 7 is a plan view looking from the near side of the board shown in Figure 6;

Figure 8 is an end view of the board shown in Figure 7;

Figure 9 is a timing diagram for various elements constituting the invention.

Carriage structure

Figure 1:
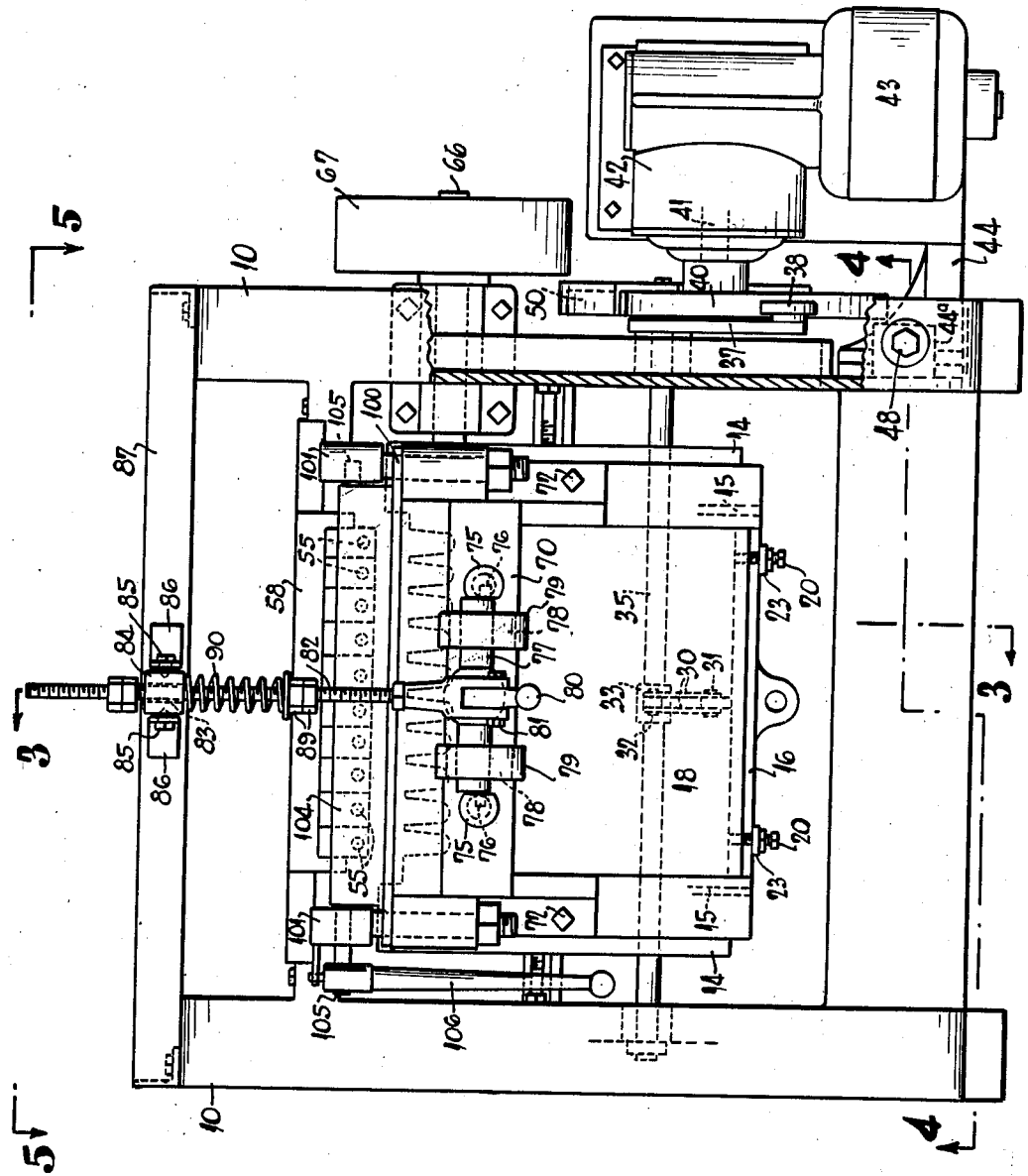
Figure 1 is a plan view, with certain portions thereof shown in section, illustrating a dovetailing machine embodying the present invention.

Referring more particularly to the drawings, the numerals 10 denote suitable side frames which are held in spaced relation to each other by any suitable means such as cross piece 11 disposed near the upper ends of the side frames. This cross piece supports a suitable frame 12 and the upper portion of this frame supports suitable parallel spaced mortised guideways or pieces 14 which, in turn, accommodate suitable tenons 15 of a carriage bracket 16. The upper surface of the carriage bracket 16 is inclined as at 17. This inclined surface supports an L-shaped table member 18 which, in turn, supports a board or workpiece 19 for mortising operations. The table member 18 is adjustably held in position upon the surface 17 by means of suitable adjustment screws 20, said screws being threadably secured in upstanding strap members 23, extending upwardly from the carriage bracket 16. By manipulating the screws 20 the L-shaped table member 18 may be moved to the right or to the left upon inclined surface 17 in Figure 3 to thereby vary the elevation of the upper horizontal surface upon which the workpiece 19 is adapted to rest. The parts 15, 16, 17, 18, 20 and 23 constitute a carriage which reciprocates back and forth between mortised guideways 14 during the operation of the machine.

Carriage reciprocating mechanism

In order to provide means for oscillating the carriage and associated workpiece 19 back and forth along the mortised guideways, suitable links 30 are pivotally secured as at 31 to the bracket 16, the other end of said links being pivotally secured to the upper end of a lever 33. This lever 33 has its lower end fixedly secured around a shaft 35, which in turn is mounted for oscillation between the side frames 10. Also fixedly secured upon the shaft 35 is a second lever 37, and the free end of lever 37 has a roller 38 on its free end. The members 33, 35, and 37, constitute a bell crank arrangement for oscillating the carriage.

Roller 38 follows the periphery of a cam 40, and also passes through grooved or closed portion 50. This cam is fixedly secured upon a shaft 41, which extends from a gear reduction housing 42. Suitable reduction gears (not shown) are disposed within this housing, and these gears are driven by a conventional motor 43.

Carriage stroke adjustment

The cam 40, shaft 41, gear reduction housing 42 and motor 43 are mounted upon a suitable bracket 44 which bracket is secured to the side of one of the side frames 10 (Figure 2) by any suitable means such as stud bolts 45. These stud bolts 45 penetrate slots 46 in the bracket 44 and have the ends thereof threadably secured in the side frame 10. The purpose of the vertically disposed slots 46 is to permit vertical adjustment of the position of the bracket 44 and its associated load when it is desired to regulate the depth of mortise in workpiece 19. In order to provide for a minute vertical adjustment of the bracket 44, a vertically disposed rod 48 is rotatably mounted in a smooth bore 49 in side frame 10. The lower end of rod 48 is threadably mounted in an outstanding leg 44a of the bracket 44 (see Figures 2 and 4). When it is desired to vary the height of the bracket 44 and its associated mechanism and consequently to vary the carriage stroke rotative to the cutting element, it is only necessary to loosen the stud bolts 45 and then turn the bolt 48 in the desired direction to cause the bracket to be raised or lowered. When the bracket has been properly positioned, the stud bolts 45 are again tightened to hold the parts in adjusted position. In other words, the purpose of vertically adjustable bracket 44 along with the associated cam 40 is to vary the position of the extreme limits of the carriage stroke and therefore vary the depth of mortise cut in the workpiece.

When the bracket 44 and cam 40 are moved upwardly from the position shown in Figure 2, then the oscillation of the carriage to the right will be farther. On the other hand if it is desired to reduce the distance that the carriage moves to the right, it will be necessary to lower the bracket 44 and the associated cam 40 from the position shown.

The cam 40 has associated therewith a closed or grooved portion 50 which is adapted to pass over the roller 38 during a partial revolution, that is while the carriage is moving from right to left in Figure 2. The purpose of this grooved runway 50 is to provide positive means for returning the carriage from advanced position. In the present instance the roller 38 is disposed on the uncovered periphery of the cam 40 and therefore as the cam rotates in a clockwise direction from the position shown, the carriage will move to the right in Figures 2; whereas when the groove 50 is passing over the roller, the carriage will move to the left.

Cutting mechanism and driving means therefor

The carriage moves back and forth between mortised guideways 14, toward and away from suitable rotary cutters 55. The upper ends of these rotary cutters are disposed slightly above the top horizontal surface of table member 18 and have substantially the same shape as an inverted frustro-conical member. As the carriage moves the workpiece 19 to the right in Figure 3 and into engagement with these cutters 55, frustro-conical mortises or notches 56 are cut in the edge of the workpiece. The depth of each frustro-conical notch from the edge of the board is usually about the same as the diameter of the rotary cutter; however, it may be of any desired depth without departing from the spirit of the invention. The depth of this mortise from the face of the board, however, is usually somewhat less than the thickness of the workpiece, that is if a blind mortise is being cut. Each of the cutters 55 is fixedly secured upon the upper end of a vertically disposed rotatable shaft 57, said shaft being mounted in a suitable framework 58, which is secured between the side frames 10. By referring to Figure 5, it will be seen that the intermediate portion of each shaft 57 has a spiraled gear 60 fixedly secured thereon. The gears 60 on the adjacent shaft 57 mesh with each other. In the present embodiment there are two sets of shafts 57 of five each, and upon each shaft a pinion 60 is mounted, the adjacent pinions in each set meshing with each other. One of the pinions 60 of each set is adapted to mesh with a driving gear 59 on the upper end of a vertically disposed shaft 61 (Figure 2). Shaft 61 is rotatably mounted in bearings 62 and 63, and the lower end of the shaft 61 has fixedly secured thereon a beveled gear 64. This beveled gear meshes with a second beveled gear 65 on main drive shaft 66, said drive shaft having a suitable drive pulley 67 fixedly secured on the end thereof.

Upon the rotation of the pulley 67 from any suitable source of power, the cutters 55 are rotated, and therefore when the carriage and workpiece 19 are advanced to the right in Figures 2 and 3, suitable frustro-conical mortises or notches 56 will be cut in the edge of the workpiece (see Figures 3, 6, 7, and 8). It is therefore seen that the carriage and associated workpiece are positively and automatically advanced into engagement with the cutters 55 and also positively and automatically withdrawn therefrom after the mortises have been cut.

Especial attention is called to the shape of the cam 40 (Figures 2 and 9). It is here seen that as the cam 40 continues its clockwise rotation from the position shown in Figure 2, the roller 38 continues to rise to thereby rotate the shaft 35 to cause the workpiece 19 to be moved into engagement with the cutters 55. After the cam 40 has rotated substantially 45 degrees from the position shown, the carriage and the workpiece 19 will have advanced to its farthest position relative to the cutters 55, after which the roller and carriage will remain substantially in the same position for another 110 degrees of rotation of the cam because the radius of the cam remains the same (see Figure 9). When the roller 38 is disposed on this constant radius, the workpiece 19 is held in engagement with the cutters 55 to permit the mortises to be thoroughly reamed. There is a very distinct advantage in providing this dwell or rest period during which the cutters 55 are disposed in the depth of the mortises 56. For example, where extremely hard material 19 is used, there is a tendency for the cutters 55 to bend or flex when the workpiece is moved into engagement therewith or the wood may be compressed in the cutting operation and then will spring back to restrict the cavity cut by the cutters, and if the workpiece is immediately withdrawn after reaching the extreme advanced position, the cutters will not completely ream the hole as deeply as it should be. However, by permitting the cutters to remain in the depth of the mortises for an appreciable length of time, the mortises will be reamed completely to the same depth regardless of the hardness or resiliency of the workpiece.

*Automatic workpiece clamping mechanism*

It is very essential that the workpiece be held in exactly the proper position during a mortising operation. To this end, a suitable bracket 70 has been fixedly secured upon the upper portion of carriage bracket 16 by any suitable means such as bolts 72. The bracket has a hollow portion 73 which accommodates a suitable horizontally disposed clamping member 74, said member being disposed on the lower ends of vertical slidably mounted shafts 75. The upper ends of the shafts 75 have rotatably mounted therein, suitable pivot projections 76 which are eccentrically mounted in each end of a transverse shaft 77. Shaft 77 is mounted in alined stationary oval-shaped slots 78 in the upper ends of eye bolts 79. Figures 2 and 3 clearly show the position of eccentric pivot projections 76 relative to shaft 77 and slot 78. Since the slots 78 in the members 79 are held in stationary position, it is evident that as the shaft 77 rotates about pivots 76 the rods 75 and clamping members 74 will be raised or lowered, depending upon the direction of rotation of the shaft.

The intermediate portion of the shaft 77 has a lever 80 extending upwardly therefrom and fixedly mounted thereon. This lever has pivotally secured thereto as at 81, a horizontally disposed rod 82, which rod has the intermediate portion thereof slidably mounted in a smooth bore 83 in a block 84. Block 84 is fixedly mounted between suitable pivot screws 85 in the vertical legs of angle brackets 86, said brackets 86, in turn, being supported by an angle frame 87 extending upwardly from side frames 10. Threadably mounted around the rod 82 adjacent the lever 80 are suitable nuts 89, which confine one end of a suitable compression spring 90 around the rod and at the same time hold the other end of compression spring against the block 84.

As the cam 40 rotates in a clockwise direction in Figure 2, to automatically advance the carriage mechanism and workpiece 19 toward the cutters 55, the spring 90 will automatically be compressed to yieldingly rotate the lever 80 and shaft 77 in a counter-clockwise manner (Figures 2 and 3), to lower the clamping member 74 upon the workpiece 19.

In the operation of the present apparatus the workpiece is first positioned on top of table member 18. As the table member 18 and the workpiece advance toward the cutters 55 the clamping mechanism will be automatically lowered into yielding engagement with the workpiece, to hold the same in clamped position upon the table 18 while the mortises 56 are being cut (see Figure 9). The purpose of providing the sliding fit between the block 84 and rod 82 is to permit spring 90 to be compressed as the clamp plate 74 is being lowered. In other words, where there is a slight variation in the thickness of the workpiece 19, the clamp 74 will be automatically moved into clamping engagement therewith. Any farther movement of the carriage toward the cutters will not affect the clamping means materially but will only serve to compress the spring 90.

Where it is desired to vary the amount of initial pressure exerted by the clamping member 74 upon the workpiece, it is only necessary to manipulate the nut 89 on the rod 82 to vary the pressure on spring 90. A further adjustment can be made by loosening suitable set screws 79a so that the elevation of eye bolts 79 can be changed.

It will be noted that the cutters 55 are disposed substantially in a straight line (Figure 1). When cutting a plurality of alined mortises in the edge of the workpiece, it is important that the mortised edge be held in parallel relation to the line of cutters so that each mortise will be cut exactly the same depth from the edge. In order to perform this function properly it is necessary to have a suitable stop plate such as 100. The ends of this plate are slidably mounted around shouldered bolts 101 disposed at each end of the bracket 70. The lower edge of this plate extends downwardly, slightly below the top edge of the workpiece 19 (Figure 3), but terminates slightly above the top of the cutters 55, so that the plate may move with the carriage over the cutter members without contacting the same. The plate 100 is held in engagement with the right-hand face of bracket 70 (Figures 2 and 3), by means of a suitable eccentrically mounted roller 104, said roller being pivoted as at 105 in the enlarged head portions of bolts 101. The roller 104 is turned by means of a suitable lever 106 when it is desired to clamp or release the plate 100.

It is therefore seen that I have provided a simple apparatus which is capable of simultaneously cutting a plurality of mortises of uniform depth in the edge of a workpiece. This apparatus is simple in construction, easy to manufacture, and automatically operated, thus eliminating many hand operations which have heretofore been necessary in cutting mortises.

In the drawings and specification, there has been set forth a preferred embodiment of the invention, and although specific terms are employed, they are used in a generic and descriptive sense only and not for purposes of limitation, the scope of the invention being set forth in the claims.

I claim:

1. A machine clamp including a framework, a table for supporting a workpiece, means slidably mounting the table in the framework, said table being movable towards and away from an operative position, and means for automatically clamping the workpiece on the table as it moves towards the operative position and for releasing it as the table moves away from the operative position, the clamping means including a vertically movable clamping member slidably mounted with respect to the table, an eccentric member pivoted with respect to the table and having connection with the vertically slidable member for operating the same, a lever on said eccentric member, a link carried by said lever and being slidably mounted in a portion of the framework, a spring on said link for normally holding the vertically movable clamping member in raised position and serving to retard bodily movement of said lever as said table is moved to operative position to oscillate said eccentric and to thereby lower and resiliently press the vertically movable clamping member into engagement with the workpiece as the table is so moved forwardly.

2. A machine clamp comprising a framework, a table for supporting the workpiece, means slidably mounting said table in the framework for movement towards and away from an operative position, a superstructure on the table, clamping means for the workpiece mounted in the superstructure and including a vertically slidable member for engaging the workpiece, an oscillatory eccentric member in the superstructure for operating the vertically slidable member, a lever on the eccentric member, a link pivotally connected at one end to the lever, a support rising from the framework, means on the support for slidably supporting the link, a compression spring disposed on the link for retarding movement of one end of said lever as the table moves to the operative position to effect oscillation of said lever to move the vertically slidable member downwardly as the table is advanced towards the operative position to press the workpiece against the table before the workpiece is presented at the operative position of said table.

3. A clamp including a framework, a table, means mounting said table for movement from an operative position to an inoperative position, means on the table for clamping a workpiece while it is moved to its operative position, said means comprising a bracket disposed above the table, a vertically movable clamping member slidably mounted on the bracket, an eccentric member pivoted on the bracket and having connection with the vertically slidable member for operating the same, a lever on said eccentric member, a link carried by said lever and being slidably mounted in a portion of said framework, a spring on said link for normally holding the vertically movable member in raised position and serving to retard bodily movement of said lever as said table is moved to operative position to oscillate said eccentric and thereby to lower and resiliently press the vertically movable clamping member into engagement with the workpiece as the table is so moved.

MONROE M. TEAGUE.